United States Patent [19]
Dolbear et al.

[11] Patent Number: 5,586,626
[45] Date of Patent: Dec. 24, 1996

[54] BRAKES

[75] Inventors: Keith D. Dolbear, Buxton; Trevor W. Beamond, Matlock; Kerry G. Schofield, Breadsall, all of England

[73] Assignee: Ferodo Limited and British Railways Board, England

[21] Appl. No.: 455,249

[22] Filed: May 31, 1995

Related U.S. Application Data

[63] Continuation of Ser. No. 204,239, filed as PCT/GB92/02055, Nov. 6, 1992, abandoned.

[30] Foreign Application Priority Data

Nov. 15, 1991 [GB] United Kingdom .................. 9124381

[51] Int. Cl.$^6$ ............................ F16D 65/02; F16D 69/04
[52] U.S. Cl. ........................ 188/250 B; 188/73.1
[58] Field of Search ................... 188/73.1, 73.37, 188/250 B, 250 E, 250 G; 192/107 C, 107 M

[56] References Cited

U.S. PATENT DOCUMENTS

| | | | |
|---|---|---|---|
| 2,907,430 | 10/1959 | Grote | 192/66 |
| 3,400,789 | 9/1968 | Mioue | 188/250 B |
| 3,477,551 | 11/1969 | Beuchle et al. | 188/250 B |
| 3,885,651 | 5/1975 | Odier | 188/73.37 |
| 4,373,615 | 2/1983 | Melinat | 188/73.37 |
| 4,535,874 | 8/1985 | Pollinger et al. | 188/73.1 |
| 4,640,390 | 2/1987 | Saumweber et al. | 188/73.37 |
| 4,781,275 | 11/1988 | Olsen | 188/251 A |

FOREIGN PATENT DOCUMENTS

| | | |
|---|---|---|
| 0351447A1 | 9/1983 | European Pat. Off. . |
| 0351447B1 | 9/1983 | European Pat. Off. . |
| 725588 | 3/1955 | United Kingdom . |
| 854471 | 1/1959 | United Kingdom . |
| 1249922 | 10/1971 | United Kingdom . |
| 1359570 | 7/1974 | United Kingdom . |
| 1380501 | 1/1975 | United Kingdom . |
| 2026112 | 1/1980 | United Kingdom .................. 188/244 |
| 2086502 | 5/1982 | United Kingdom . |

*Primary Examiner*—Robert J. Oberleitner
*Assistant Examiner*—Chris Schwartz
*Attorney, Agent, or Firm*—Nixon & Vanderhye P.C.

[57] ABSTRACT

A brake having a brake element, such as a brake pad for engagement with the flat surface of a disc or like moving element of a brake system, has a relatively soft layer (4) of elastomeric material interposed between a layer of friction material (3) of the pad lining (1), and the backing plate (2) to which the lining (1) is secured. The elastomeric material is required to have a Rockwell value greater than 0.30 millimetre penetration. The elastomeric material may have a Rockwell value of a depth of penetration at least twice that of the friction material. Hot-spotting and thermal damage to the moving element are thus reduced, and so is wear of the lining (1) itself.

5 Claims, 1 Drawing Sheet

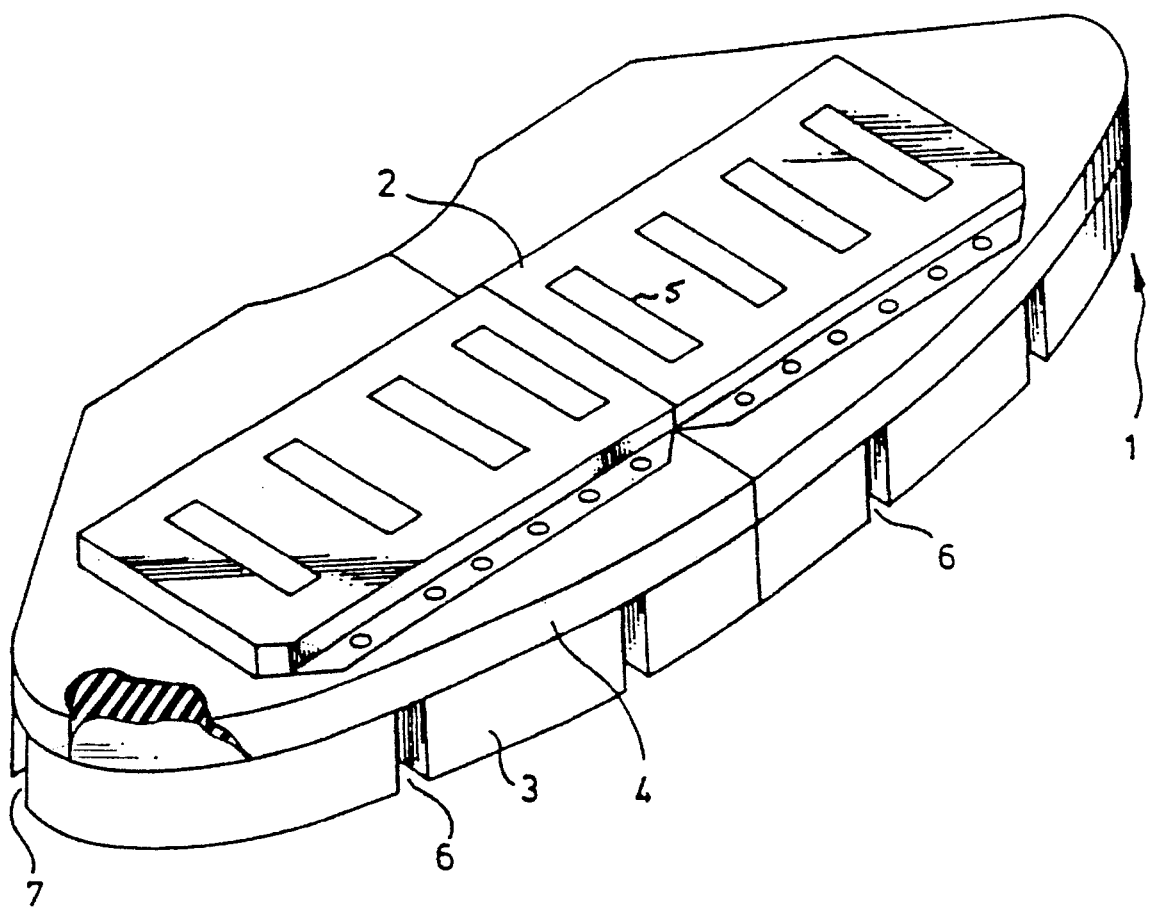

BRAKES

This is a continuation of application Ser. No. 08/204,239, filed as PCT/GB92/02055, Nov. 6, 1992, now abandoned.

This invention relates to brakes, and more particularly to brake elements comprising linings secured to backing plates such as brake blocks, or brake pads.

For example, a brake pad is mounted in a carrier and is slidable forwards and backwards along a guideway in the carrier into and out of a working position in which it can be locked, for engagement with the moving element of a brake system to be retarded or stopped. Such pads are used in rail vehicle brake systems, but are in principle usable elsewhere, for example in heavy goods road vehicles. When a lining has become worn or otherwise defective, then by releasing the lock, the pad can be slid backwards along the guideway and so withdrawn from the carrier; replacement of a fresh pad is thus facilitated.

It is an object of the present invention to provide brake elements comprising linings secured to backing plates such as brake blocks or brake pads wherein each such lining reduces hot-spotting of and thermal damage to the surface of a moving element, such as a rotary element, which it retards or stops when engaged therewith. Additionally, wear of the lining itself may be reduced compared with known forms of such linings.

According to the invention, there is provided a brake element comprising a lining having a layer of elastomeric material and a layer of friction material secured to a backing plate, wherein the layer of elastomeric material of the lining is relatively soft compared with the layer of friction material of the lining, and is interposed between the layer of friction material and the backing plate, the brake element being characterised in that the elastomeric material has a Rockwell value, as defined below, of greater than 0.30 millimetre penetration.

It may be that the improved properties resulting from this construction for such a brake element are a result of the layer of elastomeric material making the lining more conformable to the working surface of the moving element, compared with known forms of such linings, and so that the two surfaces engage more uniformly.

Preferably the elastomeric layer has a Rockwell value of a depth of penetration at least twice that of the friction material.

The friction material may have a composition including a polymeric binder together with reinforcing fillers and/or binders, and may be entirely conventional, such as for example that described in U.S. Pat. No. 3,227,249, or, if the non-asbestos kind is desired, that described in GB 1,604,827; and may also include fibres.

The elastomeric layer may likewise vary widely in composition, provided that it is not cured to a degree beyond that at which it becomes so cross-linked as to lose its softness relative to that of the friction material. Thus, there may be used the compositions described in Ferodo Limited GB 1 249 922 as being suitable for the manufacture of non-squeal railway brake blocks for direct engagement with the external periphery of a rail vehicle wheel.

It is preferred that the thickness of the elastomeric layer should be no less than 3 millimetres. Preferably the ratio of the thickness of the elastomeric layer to that of the layer of friction material is not less than 1:10, particularly not less than 1:5; and a preferred maximum ratio is 1:1.

The invention will now be further described with reference to the Example; and to the accompanying drawing, which is a perspective view of a brake pad according to the invention, the pad is shown as being in two parts, each with a lining having a surface that is essentially flat, and is to engage a moving element, and the lining is secured to a metal backing plate.

The illustrated brake pad is in two parts, each part having a lining 1 secured to a metal backing plate 2 which is of dovetail cross-section. The lining 1 has a surface remote from the backing plate 2 which is essentially flat, is to be engaged by a moving element to be retarded or stopped, and is provided by a layer 3 of friction material. The moving element to be retarded or stopped may comprise the disc of a disc brake system. Between the layer 3 of friction material and the backing plate 2, is a relatively soft layer 4 of elastomeric material, securely bonded to both the layer 3 of friction material, and the backing plate 2. The backing plate 2 is keyed to the elastomeric layer 4 by tongues pressed out of the plane of the plate, leaving apertures 5 therein. The layer 3 of friction material is conventionally grooved, both transversely as at 6 and longitudinally as at 7.

For a pad of half-length 200 millimetres, suitable thicknesses for the layer 3 of friction material 1 and the elastomeric layer 4 are 12 millimetres and 6 millimetres respectively. Typical Rockwell values (ball diameter 2.54 centimetres, with 30 kilograms major load) are:

for the friction material, 0.20 millimetre penetration (a Shore D value of 75); and for the elastomeric layer >0.30 millimetre penetration (a Shore D value <50).

EXAMPLE

1. A metal backing plate is shot-blasted to clean it, and adhesive of the kind conventionally used for direct bonding of the lining is applied to the plate and allowed to dry off during 12 hours.

2. Enough uncured mix for formation of a layer 2 millimetres thick of cured conventional friction material, as referred to above. The composition is employed in particulate form: first its ingredients are mixed in a Banbury mixer, and the resulting unitary mass is then disintegrated. The particles are put into a die having the shape of a half-pad.

3. A sheet of an elastomeric material is prepared by mixing:

|  | % by weight | Function |
| --- | --- | --- |
| Nitrile rubber | 28.3 | Elastomer binder |
| Powdered Sulphur | 2.8 | Curing agent |
| Accelerator | 0.6 | |
| Powdered Carbon Black | 5.7 | Reinforcing filler |
| Powdered Whiting | 57.0 | Bulking filler |
| Asbestos or other reinforcing fiber | 5.6 | Reinforcement fiber |

The mixture is roll milled hot to produce a sheet 8 millimetres thick. This sheet is cut to fit into the die, and is placed on top of the layer of friction material already in the die.

4. The metal backing plate is superimposed on the elastomer layer, and the assembly is pressed under a pressure of 85 megaPascals at ambient temperature for 15 seconds.

5. The pads are packed under a pressure greater than 62 kiloPascals, and the assembly is baked in an air-circulation oven for 1 hour at 160° C., plus 1 hour at 200° C. and 3 hours at 235° C., to cure both the thin layer of friction material and the layer of elastomer composition. Baking is carried out in packs with metal inserts to prevent undue compression of the elastomeric layer during its cure. Any exudate of elastomer at the assembly sides is then removed by machining. The exposed surface of the friction material is then ground to prepare it for the bonding of further friction material.

6. Adhesive is applied to the ground surface and allowed to dry off, and there is then applied to that surface a shaped already - glued slad of friction material 12 millimetres thick which has been made separately from the uncured mix of step 2 earlier.

This final assembly is loaded with others into an air oven and baked for 2 hours at 180° C.

7. The baked assembly is finally ground to a total thickness (the layer of friction material plus the layer of elastomeric material) of 18 millimetres, and grooves are then cut in the surface of the layer of friction material by conventional procedure.

A brake element in accordance with the present invention, may also comprise part of a brake block.

We claim:

1. A brake element for engaging a surface of a moving component of a brake system, comprising a lining secured to a backing plate, wherein the lining includes a layer of elastomeric material and a layer of friction material, the layer of elastomeric mateiral having a Rockwell value of a depth of penetration of greater than 0.30 millimeter penetration and at least twice that of the layer of friction material, and wherein the layer of elastomeric material is interposed between the layer of friction material and the backing plate, thereby permitting the lining to more closely conform to the moving component and to thereby also reduce hot spotting of the surface of the moving component.

2. The brake element according to claim 1, wherein the relatively soft layer is at least 3 millimetres thick.

3. The brake element according to claim 2, wherein the thicknesses of the relatively soft layer and the layer of friction material are in a ratio which is not less than 1:10.

4. The brake element according to claim 3, wherein said ratio is in the range of 1:5–1:1.

5. A brake element comprising a lining secured to a backing plate, wherein the lining includes a layer of elastomeric material and a layer of friction material, the layer of elastomeric material being relatively soft compared with the layer of friction material, and wherein the layer of elastomeric material is interposed between the layer of friction material and the backing plate, and further wherein the layer of elastomeric material has a Rockwell value, as herein defined, of greater than 0.30 millimetre penetration; and wherein said elastomeric material has a composition consisting of:

| | |
|---|---|
| nitrite rubber | 23.3% by weight |
| powdered sulfur | 2.8% by weight |
| accelerator | 0.6% by weight |
| powdered carbon black | 5.7% by weight |
| powdered whiting | 57.0% by weight and |
| asbestos or other reinforcing fiber | 5.6% by weight. |

* * * * *